United States Patent Office 3,443,841
Patented May 13, 1969

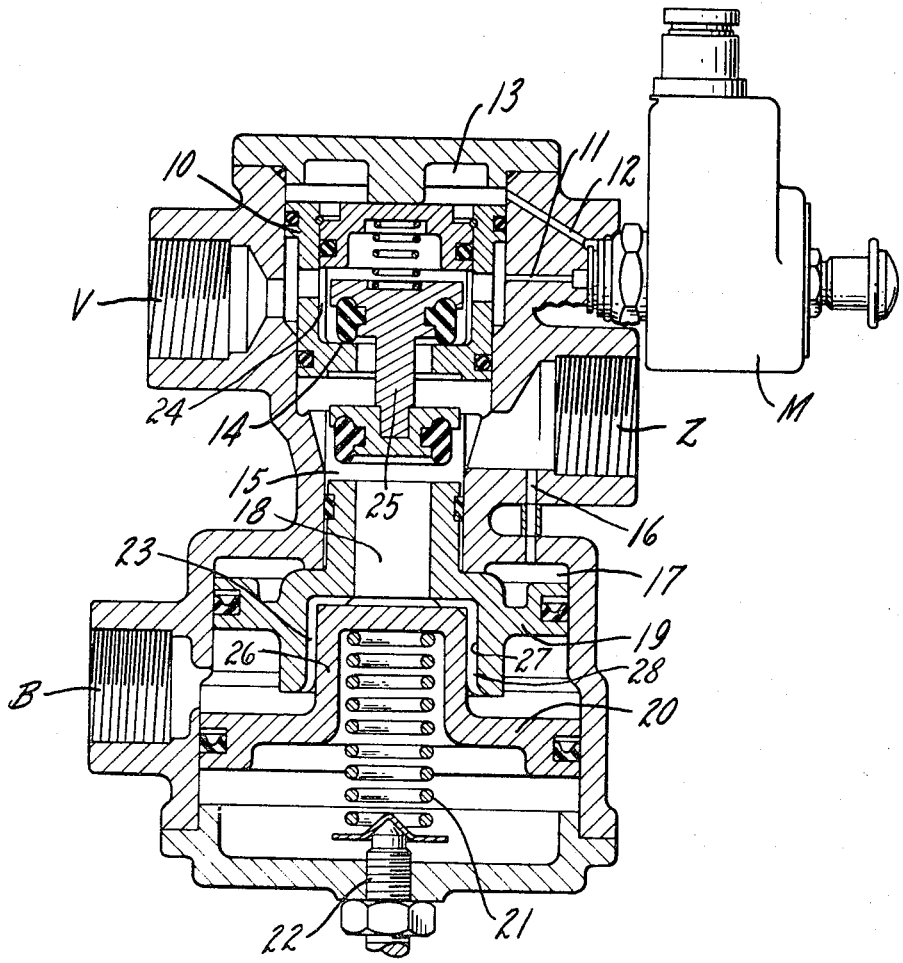

3,443,841
COMPRESSED AIR BRAKE SYSTEM FOR A TRAILER HAVING A MAGNETIC PERMANENT BRAKE VALVE
Werner Kobnick, Heidelberg, Germany, assignor to Berg Mfg. & Sales Co., a corporation of Illinois
Filed Dec. 15, 1966, Ser. No. 601,954
Claims priority, application Germany, Dec. 17, 1965, B 85,029
Int. Cl. B60t 7/00, 13/70, 15/14
U.S. Cl. 303—15                                  4 Claims

ABSTRACT OF THE DISCLOSURE

A permanent brake valve for delivery of the greater of a constant permanent braking pressure and a variable service braking pressure to the brake cylinders of a motor vehicle trailer, including, a housing formed with a first inlet, a second inlet, and an outlet; a hollow valve piston having openings communicating the first inlet and the outlet; a double-ended valve having a first end adapted to close one of the valve piston openings and a second end adapted to engage a weigh piston and close a passage formed in the weigh piston which communicates the second inlet with the outlet; a solenoid actuated valve operative to direct pressure at the first inlet to one side of the valve piston to move the valve piston in a direction which causes the second end of the double-ended valve to engage the weigh piston; a spring operative to exert a force on the weigh piston to urge the weigh piston toward engagement with the double ended valve; and a third piston interposed between the weigh piston and the spring and forming a chamber with a weigh piston which communicates with the second inlet.

Background of the invention

This invention relates to a compressed air brake system having a magnetic permanent brake valve for a motor vehicle trailer, wherein the weigh piston thereof is adapted to be impinged by the service brake pressure in the same sense, in which also the weigh spring acts upon the same, when the service brake is actuated.

In a known system of this type, a pneumatic breaker switch is disposed between the control valve of the trailer and the brake pressure entrance—controlled by this control valve—of the magnetic permanent brake valve, which breaker switch opens an electrical contact—when the service brake pressure approximately corresponds to the permanent brake pressure—which is disposed in the supply circuit of the magnetic coil of the magnetic permanent brake valve. By this measure, it is avoided that the actual brake pressure in the trailer should be composed of the sum of the permanent brake pressure and the service brake pressure appearing at the exit of the control valve of the trailer, when the permanent brake is engaged and also the service brake is additionally actuated. This known system has the disadvantage that the brake characteristic of the trailer, i.e., the brake pressure of the trailer, makes a jump in dependency upon the brake pressure, behind the control valve of the trailer.

There is also known a compressed air brake system including a magnetic permanent brake valve for a motor vehicle trailer, wherein the magnetic permanent brake valve is interposed between the supply vessel of the trailer and an entrance of a two-way valve, and wherein the pressure proceeding from the trailer control valve is delivered directly at the other entrance of the two-way valve. In this case, the magnetic permanent brake valve has no connection for the brake pressure proceeding from the trailer control valve. The corresponding chamber of the valve underneath the weigh piston is continually connected with the atmosphere. The braking pressure characteristic of a trailer having such a compressed air system is relatively favourable, i.e. the brake pressure in the cylinders of the trailer, when the service brake and the permanent brake are simultaneously actuated, rises only when the service brake pressure—i.e. the pressure which is delivered by the trailer control valve—becomes higher than the permanent brake pressure. At this moment, in the two-way valve the connecting line between the brake cylinders and the Z-connection of the magnetic permanent brake valve will be closed, while now the brake pressure supplied by the trailer control valve is transmitted to the brake cylinders. Thus, in the characteristic proceeding from a trailer brake pressure of the height of the permanent brake pressure, while the service brake pressure rises, initially there is obtained a constant trailer brake pressure. When the permanent brake pressure is equal to the service brake pressure, then the trailer brake pressure or the brake cylinder pressure, while the service brake pressure further rises, will follow the service brake pressure.

Summary of the invention

Now the invention provides a system of the initially mentioned type, which has the favourable characteristic of the just described system and in which it is unnecessary to provide either a two-way valve or a pneumatic switch. In this manner, the system is simplified and, in particular, few connections must be made. Hence the invention is concerned with a system of the initially mentioned type and consists substantially in that the weigh spring of the permanent brake valve is connected with a piston which is impinged by the service pressure and which pushes the weigh spring (21) away from the weigh piston against its bias away from the piston, when the service brake pressure is effective. In this manner it is achieved that the service brake pressure commencing and rising when the permanent brake is engaged will tension the weigh spring away from the weigh piston, so that a trailer brake pressure composed of the service brake pressure and the permanent brake pressure can by no means occur.

Brief description of the drawing

The invention is illustrated more or less diagrammatically in the accompanying drawing wherein a partial cross-sectional view of the brake valve of this invention has been shown.

Description of the preferred embodiment

Further advantages and details of the invention will be apparent from the following description of an exemplary embodiment with reference to the drawing, the single figure of which shows a magnetic permanent brake valve according to the invention, in a longitudinal sectional view.

The magnetic permanent brake valve has three connection points: at connection point V lies permanently the pressure of the supply vessel of the trailer; at connection point B lies the service brake pressure delivered by the control valve of the trailer; at Z, the brake cylinders of the trailer are connected. M indicates the known electromagnet, upon the energization of which the lines 11 and 12 will be connected with each other, so that the supply vessel pressure constantly prevailing in the bore or core 24 of the known valve piston 10 can propagate to the space 13 above the valve piston 10. As will be understood by those skilled in the art, when the magnet M is deenergized, chamber 13 is vented to the atmosphere via passage 12 and when magnet M is energized, chamber 13 is no longer connected to the atmosphere but is connected to the pressure in core 24 through passages 11 and 12. In the valve piston 10 is disposed the double valve 25 adapted to open and close the two passageways 14 and 15. The valve 25 is resiliently biased or pretensioned against the valve piston 10 in the closing sense of the passageway 14.

Beneath the double valve 25 within the housing there is slideably mounted the weigh piston 19 which is formed as a differential piston. The weigh piston has a central bore 18 which, together with the lower valve cone of the double valve 25, forms the passage 15. Beneath the weigh piston 19 according to the invention is mounted a further free-floating piston 20 which is pretensioned or biased by the known weigh spring 21 in the direction of the weigh piston 19. Although the spring 21 has been shown as being a unitary helical spring, it should be understood that it may be otherwise. For example, two or more telescoped springs might be used. An annular chamber 17 is formed by the weigh piston 19 and the housing. The annular chamber 17 is connected with connection point Z by way of a conduit 16 so that the weigh piston is impinged, in the known manner, by the effectively prevailing brake pressure of the cylinders, on the one hand, and by the weigh spring 21, on the other hand. The piston 20, with a bulging 26, projects into a corresponding recess 27 of the weigh piston 19. The weigh piston 19 is formed with ribs 28 or the like so that always a connection or passage 23 exists between the space underneath the weigh piston and the passageway to the lower valve cone of the double valve 25.

The valve represented so far operates as follows, when permanent braking is involved: upon energization of the magnet M, the valve piston 10 will be downwardly urged by the supply vessel pressure built-in within the space 13, so that the passageway 15 is closed first, whereupon the passageway 14 is opened. In the known manner, now the surfaces of the weigh piston embodied as a differential piston as well as the positioning (e.g., by the screw 22) of the weigh spring will determine the closing position corresponding to the permanent braking pressure. That is, the pressure will build up at 2 and in chamber 17, compressing the spring 21 until passageway 14 closes. Accordingly, the permanent braking pressure is determined by the adjustment screw 22 and spring 22.

Now when the service brake is actuated during the permanent braking, i.e., when the magnet M is energized, then the service pressure will be effective via the connection point B and tends to urge the weigh piston 19 upwardly in the known manner. At the same time, the service pressure prevailing in the annular space between the pistons 19 and 20 acts on the piston 20 and tends to bias the same downwardly against the weigh spring 21. Hence as the service pressure rises, the effect of the weigh spring will be decreased, so that when closure positions are involved, which correspond to a service braking with a higher pressure than the permanent brake pressure, then the spring 21 will no longer have any influence upon the pressure at 2 or the pressure conducted to the brake cylinders.

Thus, a spring force acting against the brake cylinder pressure is eliminated in the magnetic permanent brake valve according to the present invention when the service brake is actuated irrespective of whether or not the permanent brake is actuated; whereas this same spring force, in the known valves, gives rise to a summing-up of both permanent and service pressures when the permanent and the service brake are simultaneously actuated, so that when the service pressure was applied at B, a pneumatic breaker switch to de-energize the magnet M had to be provided, or alternatively, B could be vented to the atmosphere and the service pressure could be connected to one side of a two-way valve as hereinabove described.

All of the details represented so far are important for the invention.

What is claimed is:

1. In a magnetic premanent brake valve for use in a motor vehicle trailer air brake system of the type including a housing having a first inlet for communication with a source of pressure, an outlet for communication with the trailer brake cylinders, and a second inlet for communication with a source of variable service braking pressure; a weigh piston in said housing having an opening formed therein for communicating said second inlet with said outlet, a first face communicating with said outlet, and a second face communicating with said second inlet; means for remotely establishing and maintaining a predetermined permanent brake pressure at said outlet, said means including a valve having a first end and a second end, said first end of said valve adapted to open and close communication between said first inlet and said outlet, said second end adapted to engage said weigh piston and close said weigh piston opening; and yielding means to operatively force said weigh piston toward engagement with said second end of said valve, the improvement comprising:

means for diminishing the urging force exerted by said yielding means on said weigh piston in inverse response to service braking pressures at said second inlet.

2. The improved magnetic permanent brake valve of claim 1 further characterized in that said means for diminishing the urging force exerted by said yielding means on said weigh piston comprises a second piston engaging said yielding means and adapted to form a chamber with said second face of said weigh piston and said housing, said chamber communicating with said second inlet, with said second piston adapted to engage said weigh piston and transmit said urging force thereto.

3. The structure of claim 2 further characterized in that said second piston is interposed between said weigh piston and said yielding means, with said yielding means comprising a helical compression spring.

4. A magnetic permanent brake valve for use in an air brake system to deliver constant permanent braking pressure and a variable service braking pressure to the brake cylinders of a motor vehicle trailer, said brake valve including, in combination, a housing forming a chamber therein having a first inlet, a second inlet and an outlet, valve means in said housing chamber for establishing a predetermined permanent braking pressure at said outlet, when said first inlet is in communication with a source of pressure and said second inlet is in communication with said variable service braking pressure, and for establishing said variable service braking pressure at said outlet when the service braking pressure exceeds said permanent braking pressure, said valve means including a first valve piston having a core in communication with said first inlet, an opening formed in said valve piston for communicating said first inlet with said outlet;

a double-ended valve having a first end located in said valve piston core and adapted to close said valve piston opening, yielding means urging said first end of said double-ended valve to close said valve piston opening, said double-ended valve having a second end located externally of said valve piston;

a weigh piston having a first face communicating with said outlet, a second face communciating with said second inlet and formed with a passage communicating said second inlet with said outlet, said second end of said double-ended valve adapted to engage said weigh piston and close said weigh piston passage;

yielding means for exerting a force on said weigh piston operative to urge said weigh piston toward engagement with said second end of said double-ended valve;

means for moving said valve piston so that said second end of said double-ended valve engages said weigh piston thereby establishing said permanent brake pressure at said outlet; and a third piston interposed between said yielding means and said weigh piston, said third piston having a first face forming a chamber with said second face of said weigh piston and said housing, with said chamber being in communciation with said second inlet so that as the service pressure at said inlet is increased, the urging force exerted by said yielding means on said weigh piston is decreased.

References Cited

UNITED STATES PATENTS 2,656,014  10/1953  Fites _____ 137—6275 X
2,941,844  6/1960  Stelzer _____ 303—7

FERGUS S. MIDDLETON, *Primary Examiner.*

JOHN J. McLAUGHLIN, JR., *Assistant Examiner.*

U.S. Cl. X.R.

137—609, 627.5; 303—7, 29, 40, 48